United States Patent [19]
Spangenberg

[11] 3,709,253
[45] Jan. 9, 1973

[54] VALVE CONTROL WITH DITHER

[75] Inventor: Gerhard Spangenberg, Sullivan's Island, S.C.

[73] Assignee: Marotta Scientific Controls, Inc., Boonton, N.J.

[22] Filed: Sept. 23, 1970

[21] Appl. No.: 74,595

[52] U.S. Cl. ........137/595, 137/596.17, 137/596.18, 137/596.2, 251/129, 91/429, 91/420
[51] Int. Cl. .............................................F16k 31/06
[58] Field of Search .....251/131, 129, 30; 137/487.5, 137/595, 596.17, 596.18, 596.2; 91/429

[56] References Cited

UNITED STATES PATENTS

| | | | |
|---|---|---|---|
| 2,843,147 | 7/1958 | Penther | 251/131 |
| 3,307,824 | 3/1967 | Weisheit | 137/487.5 |
| 3,442,485 | 5/1969 | Reynolds | 251/129 |
| 3,424,951 | 1/1969 | Barker | 251/129 X |
| 3,470,892 | 10/1969 | Barker | 251/141 X |

Primary Examiner—Arnold Rosenthal
Attorney—Sandoe, Hopgood & Calimafde

[57] ABSTRACT

This invention is an electric controller which superimposes an oscillating signal on a load signal with feedback for controlling the resultant output signal. More specifically the invention has a mechanical element, particularly a poppet valve, that is operated by a signal applied to an actuator coil; and the superimposed oscillating signal causes dither of the mechanical element to overcome static friction and hysteresis. In the preferred construction, the dither signal passes from an inverting amplified to a biasing driver network, and then to a push-pull amplifier that has feedback for producing the oscillations. The preferred construction augments the oscillation by use of a voltage sensitive resistor in the feedback circuit. The dither frequency becomes lower as the valve approaches closed position. This produces greater magnitude of the dither and a degree of impact that seals the valve with less pressure required to hold the valve closed.

5 Claims, 3 Drawing Figures

VALVE CONTROL WITH DITHER

BACKGROUND AND SUMMARY OF THE INVENTION

This invention can be applied to different devices that have a mechanical element operated by an actuator in response to electric power (herein referred to as the "load signal") applied to the actuator. For example, it may be applied to an electric motor, such as a reversible servo motor which must be accurately controlled. The invention will be described as applied to a magnetically operated valve, more particularly a poppet valve, with which the invention has special advantages.

When a flow responsive value is moved into open position by its actuator, the degree of opening and the flow depend upon the strength of the load signal applied to the actuator which acts against a spring that urges the valve toward closed position. Flow-responsive means, subject to pressure drop through a restricted passage (often adjustable), which influence the degree of opening maintain constant rate of flow.

If the load signal that opens the valve is reduced slightly, the static friction that resists movement of the valve will hold the valve in the same position that it occupied before the load signal was reduced. Thus the position of the valve when closing is not the same for a given signal strength than when the valve is opening. This mechanical hysteresis is found in the operation of other mechanical elements operated by electric load signals to actuators.

This invention maintains the valve in a dynamic condition whenever the valve is open. By maintaining a constant vibration or dither of the valve, the effect of static friction is overcome and hysteresis is substantially eliminated. The dither is obtained by imposing an oscillating signal on the main operating or load signal to the actuator.

The frequency of the oscillating signal must be low enough so that the valve inertia can be overcome and actual vibration of the valve can result from the oscillating signal. Best results are obtained by having the frequency of the oscillating signal decrease as the valve element approaches closed position. This makes the valve seal with lower pressure holding the valve element closed, usually a spring pressure. It is known that valves of the poppet type seal at lower holding pressure if the valve element closes against its seat with impact. By imposing dither on the valve with the frequency of the dither reduced as the valve approaches closed position, the effect of impact closing is obtained even though the intensity of the load signal is reduced slowly.

The preferred embodiment of this invention employs several features for obtaining the dither signal and for controlling the signal effectively and efficiently with uncomplicated circuitry. One feature obtains the oscillating signal for dither by feedback through a circuit using a voltage-sensitive resistor which augments the effect of the feedback and which varies the frequency of the feedback in accordance with the strength of the valve-operating load signal and the resulting degree of opening of the valve.

In accordance with another feature of the preferred embodiment, signals from an inverting amplifier are supplied to a push-pull amplifier that selectively energizes either of two valve actuators depending upon whether a positive or a negative load signal is supplied to the first amplifier. The push-pull amplifier supplies feedback that results in the supplying of the dither signal to whichever actuator has been energized.

Other objects, features and advantages of the invention will appear or be pointed out as the description proceeds.

BRIEF DESCRIPTION OF DRAWING

In the drawing, forming a part hereof, in which like reference characters indicate corresponding parts in all the views.

DESCRIPTION OF PREFERRED EMBODIMENT

Figure 1:
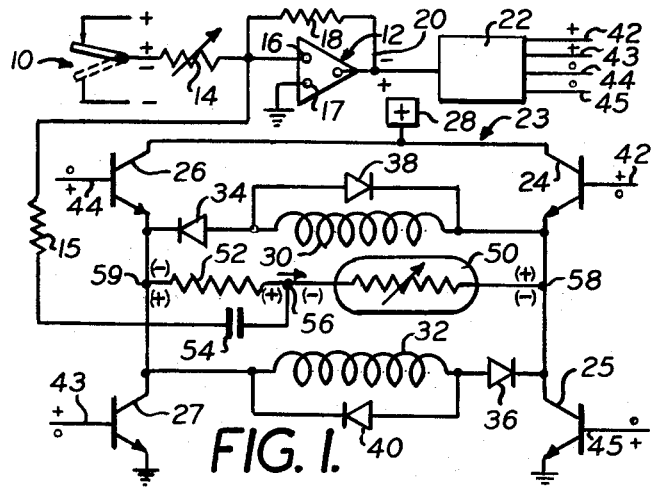
FIG. 1 is a wiring diagram showing the controller of this invention in its preferred embodiment.

FIG. 1 shows a switch 10 which can be moved selectively from the position shown in full lines to the position shown in dotted lines in order to change the polarity of a load signal which is supplied to an amplifier 12. The intensity of the load signal can be varied by an adjustable resistor 14 in series with the switch 10. This construction is merely representative of means for supplying signals of different polarity and at variable intensity to the controller of this invention.

The amplifier 12 is preferably an inverting amplifier, and in addition to a terminal 16 to which the load signal is supplied, the amplifier 12 has a reference terminal 17.

The output of the amplifier 12 is supplied through a conductor 20 to a second amplifier 22. The second amplifier circuit 22 is a biasing/driver system that changes the single input signal from conductor 20 into four output signals at conductors 42, 43, 44 and 45. These four signals are applied to a third amplifier 23. This third amplifier is a transistorized, push-pull amplifier having four transistors connected as shown. Two transistors 24 and 25 are located on one side of the amplifier and the other two transistors 26 and 27 are located on the other side of the amplifier.

There is an actuator which includes a coil 30 located across the amplifier 23, and a second actuator including a coil 32 connected across the amplifier in parallel with the coil 30. However, the coils 30 and 32 are intended to respond to signals of different polarity and for this purpose there is a diode 34 connected in series with the coil 30 and another diode 36 oriented in the opposite direction in series with the coil 32. Diodes 38 and 40 are connected across the coils 30 and 32, respectively, in accordance with the usual practice.

The transistors 25 and 26 have their bases connected with the biasing/driver circuit 22 such that, when the input signal 20 is more positive than the reference 17, circuit 22 causes output signals of conductors 44 and 45 to be positive in some fixed ratio to signal at 20 and simultaneously make output signals of conductors 42 and 43 at zero (equal to reference 17.) Conversely, when the signal at 20 is more negative than the reference 17, the signals of conductors 42 and 43 are positive in some fixed ratio to the signal at 20 and the signals of conductors 44 and 45 are at zero. The biasing circuit for the bases of the transistors 25 and 26 is indicated by the reference characters 44, 45.

When a load signal is to be applied to the coil 30, the bias circuits 42, 43 are used to make the transistors 24 and 27 conducting so that the power 28 travels through the transistor 24, coil 30, diode 34 and through the transistor 27 to ground. The transistors 25 and 27 are non-conducting and no load signal is applied to the coil 32.

When the other coil 32 is to be energized and the coil 30 is to be left unenergized, the power 28 is applied so that the current passes through the transistor 26, and through the coil 32, diode 36, and transistor 25 to ground. No current passes through the coil 30 because the transistors 24 and 27 are non-conducting and the diode 34 blocks any signal from the transistor 26 from coming through the coil 30.

The feedback circuit includes a voltage responsive resistor 50 and another resistor 52 connected in series with the resistor 50 across the push-pull amplifier 23. A capacitor 54 is connected with a terminal 56 located between the resistors 50 and 52; and the other side of the capacitor 54 connects with the summing terminal 16 of the amplifier 12, through the gain control resistor 15.

The sides of the resistors 50 and 52 opposite the terminal 56 are connected with the push-pull amplifier by terminals 58 and 59, respectively, as shown in FIG. 1. The resistor 50 is a voltage responsive resistor and its resistance is originally greater than that of the resistor 52; but as the voltage on the resistor 50 increases, the resistance of this resistor 50 decreases until its resistance is equal to that of the resistor 52.

With further increase in voltage on the resistor 50, its resistance decreases until it is less than that of the resistor 52. This influences the feedback in the following way: When the voltage between the terminals 58 and 59 is low, and the resistance of resistor 52 lower than that of resistor 50, and therefore the voltage at 56 is mainly influenced by what happens at the terminal 59. For example, a positive change in the input signal at terminal 58 causes the terminal 59 to be less positive and the feedback signal to the amplifier 12 is negative tending to cancel part of any positive signal input.

As the voltage increases at the terminal 58, the resistance of resistor 50 decreases until it is equal to the resistance of resistor 52 and with these resistors equal there is no change in voltage at the terminal 56 and there is no feedback signal. Further increase in the voltage at the terminal 58 causes the resistance of resistor 50 to further decrease so that it is less than the resistance of resistor 52 and the feedback is then influenced more by what happens at terminal 58 and the feedback signal change is positive as the voltage at 58 continues to increase. The output of the first amplifier 12 is increased to saturation and this stops further change so that there is no longer any signal through the capacitor 54 of the feedback.

Then the normal input signal of the first amplifier 12 takes over and this causes the amplifier output to return to normal, the change in output being in effect a negative signal change to the terminal 58 and to the voltage-responsive resistor 50, causing a negative signal to feedback to the amplifier 12, and a consequent reduction in the output from the amplifier 12.

The operation thus far described sets up an oscillating voltage of the feedback and this effects the amplifier 12 so as to impress or superimpose a dither signal on the load signals which come from the switch 10. This oscillating dither signal will vary with the strength of the load signal because the load signal changes the voltage at the terminal 58 and changes the resistance of the resistor 50 so as to make the frequency of the dither signal vary with the strength of the load signal, due to the change in RC time constant of resistor 50 and capacitor 54.

It will be understood that the operation of the push-pull amplifier has been described in connection with changes in voltage at the terminal 58 in response to variations in the load signal from the amplifier 12 when the load signal is of one polarity. When the load signal is of the opposite polarity, it will be understood that the variations in voltage that occur at the terinal 59 are the ones that initially affect the feedback signal.

Figure 2:
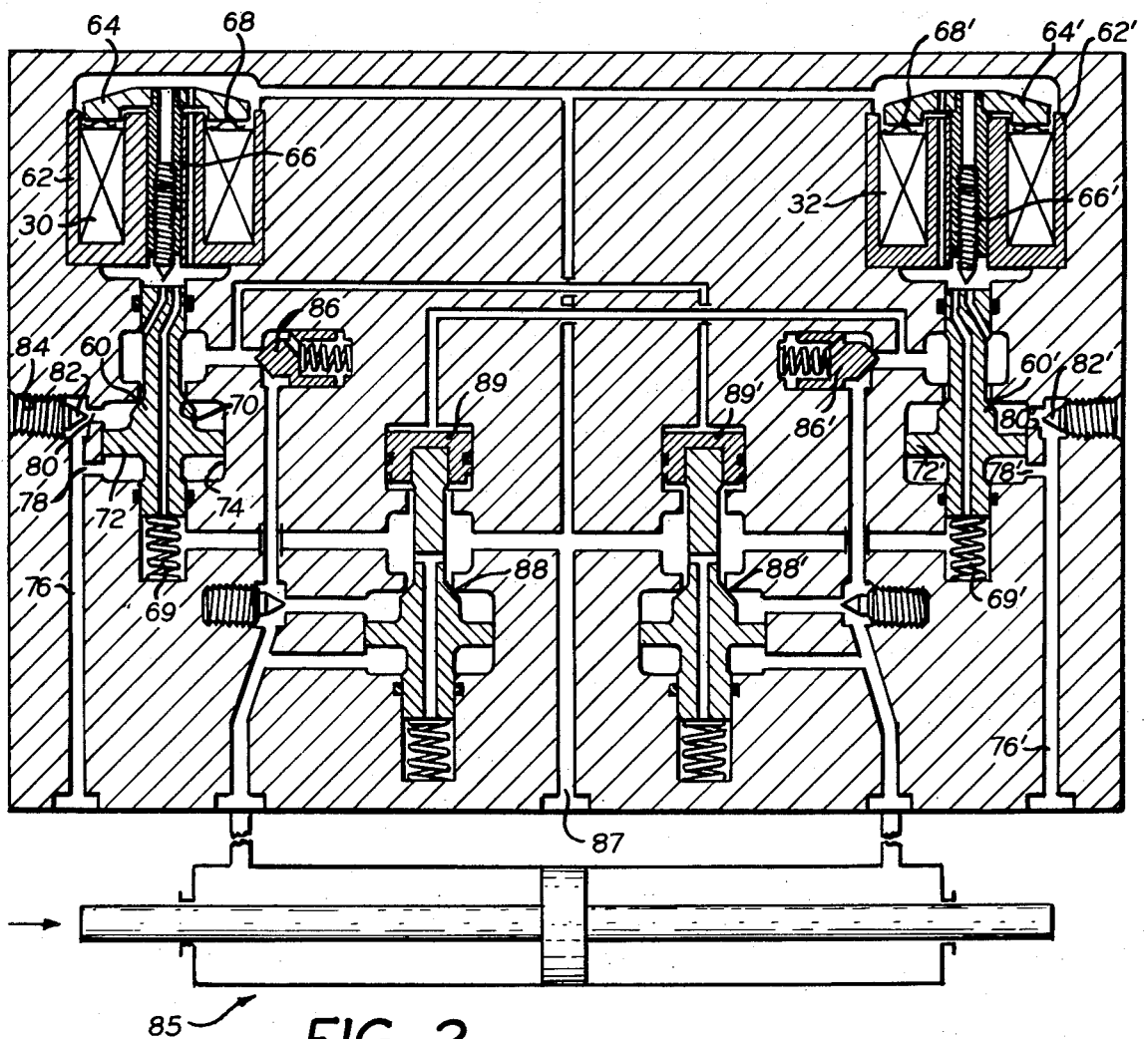
FIG. 2 is a diagrammatic view showing the operation of valves from the actuators shown in FIG. 1.

FIG. 2 shows the coils 30 and 32 constituting the magnetic coils for operating poppet valves 60 and 60', respectively. The coil 30 is enclosed in an iron housing 62 and there is an armature 64 at the top of the housing in position to be attracted toward the coil 30 and the core of the housing 62 in response to energizing of the coil 30. The poppet valve 60 is connected to the armature 64 by motion-transmitting connections designated by the reference character 66. There is a spring 68 which urges the armature 64 away from the coil 30 and housing 62 and another spring 69 urging the valve toward closed position. Thus when the coil 30 is not energized, the spring 68 moves the armature 64 away from the coil 30 and the iron core of the housing 62 and the spring 69 pushes the valve 60 into contact with a valve seat 70 to close the valve.

When the coil 30 is energized by a load signal of sufficient strength to move the armature 64 against the pressure of the springs 68 and 69, the valve 60 is moved away from the valve seat 70 and the valve opens until the pressure of the springs 68 and 69 balances the force on the armature 64. Thus the extent to which the valve 60 opens depends upon the amount of force applied by the armature 64 to the valve and this in turn depends on the strength of the load signal energizing the coil 30.

In the construction shown in FIG. 2, the valve 60 is a proportional flow valve and is designed so that for a given signal applied to the coil 30, the valve 60 opens sufficiently to produce a given flow of working fluid through the valve, regardless of the upstream pressure of the working fluid. In order to obtain this proportional flow effect, there is a piston 72 in a cylinder 74 on the upstream side of the valve 60. The working fluid to be controlled by the valve 60 enters the cylinder 74 from a fluid supply line 76 which has two ports 78 and 80 opening into the cylinder 74 on opposite sides of the piston 72.

The port 80 is of reduced cross section as the result of a needle valve 82 which projects close to and into the port 80 to various degrees depending upon movement of the needle valve 82 along threads 84 by which the needle valve is screwed into the housing of the valve.

When the valve 60 opens and flow of fluid begins, there is a pressure drop above the piston 72 because the restricted port 80 causes a pressure drop in the fluid flowing through the port 80 as compared to the fluid flow through the unrestricted port 78. As the valve 60 opens wider, and the flow increases, the pressure differential on opposite sides of the piston 72 increases and thus the piston 72 supplements the spring 69 in urging valve 60 to move toward closed position.

As the valve 60 moves toward closed position, the rate of flow decreases and this decreases the pressure drop through the restricted port 80 so that there is less pressure differential across the piston 72 and less force applied by the piston 72 tending to close the valve 60. A pressure balance develops so that for any given force applied by the magnetic actuator, consisting of the coil 30, armature 64, and motion-transmitting connections 66, there will be a corresponding rate of flow through the valve. Such flow proportioning valves in which the flow is equal to the strength of the load signal are well-known and no further explanation of these valves is necessary for a complete understanding of this invention.

The valve operated by the load coil 32 is the same as that already described for the coil 30 and corresponding parts are indicated by the same reference characters with a prime appended. From FIG. 2 it will be apparent that when one of the coils 30 or 32 is energized and the other is not, then the valve of the energized coil is open and the valve of the unenergized coil is closed. For operating a double-acting cylinder-and-piston motor, the valves 60 and 60' can be opened alternately to operate the piston in opposite directions.

The dither signal which is superimposed on the load signals supplied to each of the coils 30 and 32, causes the force for opening the valves 60 and 60' to vary and causes the valves to vibrate toward and from their seats so that all parts of the actuator including the motion-transmitting connections 66 and 66' of the valves are in a dynamic state which eliminates static friction and substantially eliminates hysteresis.

In the valve assembly shown in FIG. 2, the valve 60 controls flow to the left end of a cylinder-and-piston motor 85; and the valve 60' controls flow of working fluid to the right end of the motor. Check valves 86 and 86' prevent back flow. In the illustrated construction, exhaust of working fluid from the motor to a return port 87 leading to a sump or reservoir is controlled by exhaust valves 88 and 88' operated by actuators 89 and 89' pressurized by working fluid from valves 60' and 60 respectively; but these exhaust valves are not relevant to this invention.

Figure 3:
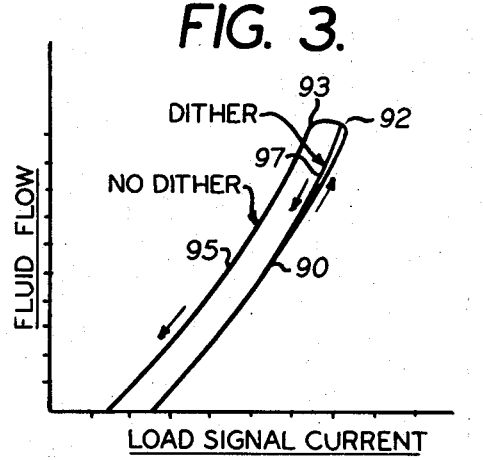
FIG. 3 is a graph showing the change in hysteresis when operating the valve with and without the dither signal.

FIG. 3 shows the effect of the dither signals on the operation of each of the valves. The energy of the load signal is measured along the abscissa of the graph shown in FIG. 3. The rate of flow of working fluid through the valve is measured along the ordinate of the graph. As the load signal increases, the flow increases in accordance with the line 90. This relation of flow to load signal current occurs as the load signal becomes stronger.

If there is no dither signal applied to the valve actuator, the load signal can be reduced by the amount indicated by the horizontal distance between the points 92 and 93 on the graph and even though this reduces the force holding the valve open, the valve does not start to close because of static friction of the parts. Before the valve starts to close, the reduction in force holding it open must be enough to provide an excess of closing force sufficient to overcome the static friction.

When the valve begins to close at the point 93, the flow decreases progressively as the load signal decreases along the line 95. The area between the lines 90 and 95 represent mechanical hysteresis.

When there is a dither signal superimposed on the load signal, the decrease in flow with decrease in load signal follows the curve 97 of FIG. 3 and there is substantially no hysteresis loss in the system. This makes the operation of the valve much more accurate inasmuch as there is no "lost motion" between a change in signal and a response of the valve to the change. It also makes the operation reliable to the extent that the flow corresponds to the signal regardless of whether the change in signal is a change calling for an increase in flow or a change in signal calling for a decrease in flow. It will be understood from FIG. 3 that with no dither, a changeover in the load signal at any place along the load signal curve, instead of going to the top of the curve, will produce a generally horizontal line, such as the line 92–93, at whatever level the change is made with resulting hysteresis and imperfections in the response of the valves to the signal.

The preferred embodiment of the invention has been illustrated and described, but changes and modifications can be made and some features can be used in different combinations without departing from the invention as defined in the claims.

What is claimed is:

1. Control apparatus including an electrically operated actuator, a circuit to said actuator, means for supplying a load signal to the actuator circuit to energize said actuator, a feedback from the actuator circuit including an oscillating circuit that superimposes a dither signal on the load signal, and characterized by a mechanical element that is operated by said actuator, bearings in which the mechanical element has friction, the magnitude and the frequency of the dither signal being correlated with the inertia of the mechanical element and the electrical impedance of the actuator circuit to maintain a vibration of the mechanical element with resulting elimination of the static friction of the mechanical element on its bearings as a factor in the movement of the mechanical element in response to load signals to the actuator, characterized by the mechanical element being a poppet valve and the actuator including a magnetic coil that moves the poppet valve with respect to a valve seat, the dither signal vibrating the poppet valve toward and from said seat, and means for increasing the magnitude of the vibrations when the valve approaches closed position.

2. Control apparatus including an electrically operated actuator, a circuit to said actuator, means for supplying a load signal to the actuator circuit to energize said actuator, a feedback from the actuator circuit including an oscillating circuit that superimposes a dither signal on the load signal, and characterized by an inverting amplifier through which energy is supplied to the circuit of the actuator, said feedback being connected with the actuator circuit on the outlet side of the amplifier and leading back to a summing juncture on the input side of the inverting amplifier, and a push-pull amplifier connected with the outlet side of the inverting amplifier, the feedback and oscillating circuit being connected across the push-pull amplifier and having an oscillating signal connection leading to the input side of the inverting amplifier, and further characterized by the mechanical element being a valve and the actuator including a magnetic coil that moves the valve between closed and open positions, a second mechanical element comprising a second valve and an actuator for the second valve including a second magnetic coil, both of the coils being connected across the push-pull amplifier with rectifiers constructed and arranged to energize one or the other of the coils selectively depending upon the polarity of the output load signal supplied to the push-pull amplifier by the inverting amplifier.

3. The control apparatus described in claim 2 characterized by the selectively conducting elements of the push-pull amplifier being transistors.

4. Control apparatus including an electrically operated actuator, a circuit to said actuator, means for supplying a load signal to the actuator circuit to energize said actuator, a feedback from the actuator circuit including an oscillating circuit that superimposes a dither signal on the load signal, and characterized by there being two actuators, each of which includes a magnetic coil, a valve operated by one of the coils, a second valve operated by the other magnetic coil, the actuators being responsive to load signals of different polarities, the means for supplying the load signal including apparatus for selectively supplying load signals of different polarity, and the feedback being from the circuits of both actuators for superimposing dither signals on the load signals of both actuators.

5. The control apparatus described in claim 4 characterized by the feedback including the same oscillating circuit for both of the actuators.

* * * * *